(12) United States Patent
Kim et al.

(10) Patent No.: US 9,898,600 B2
(45) Date of Patent: Feb. 20, 2018

(54) METHOD AND APPARATUS FOR MANAGING APPLICATION DATA OF PORTABLE TERMINAL

(71) Applicant: AHNLAB, INC., Gyeonggi-do (KR)

(72) Inventors: Taewoong Kim, Gyeonggi-do (KR); Sangpyo Park, Seoul (KR)

(73) Assignee: AHNLAB, INC., Gyeonggi-Do (KR)

( * ) Notice: Subject to any disclaimer, the term of this patent is extended or adjusted under 35 U.S.C. 154(b) by 0 days.

(21) Appl. No.: 14/889,499

(22) PCT Filed: Apr. 11, 2014

(86) PCT No.: PCT/KR2014/003141
§ 371 (c)(1),
(2) Date: Nov. 6, 2015

(87) PCT Pub. No.: WO2014/181970
PCT Pub. Date: Nov. 13, 2014

(65) Prior Publication Data
US 2016/0098557 A1 Apr. 7, 2016

(30) Foreign Application Priority Data
May 7, 2013 (KR) ........................ 10-2013-0051273

(51) Int. Cl.
*G06F 21/53* (2013.01)
*G06F 21/62* (2013.01)

(52) U.S. Cl.
CPC .......... *G06F 21/53* (2013.01); *G06F 21/6218* (2013.01); *G06F 2221/033* (2013.01)

(58) Field of Classification Search
CPC . G06F 21/53; G06F 21/6218; G06F 2221/033
See application file for complete search history.

(56) References Cited

U.S. PATENT DOCUMENTS

| 9,529,871 | B2* | 12/2016 | Vibhor | G06F 17/30557 |
|---|---|---|---|---|
| 2009/0017790 | A1* | 1/2009 | Thalapaneni | H04L 29/12047 455/410 |
| 2010/0299376 | A1* | 11/2010 | Batchu | G06F 21/6245 707/805 |
| 2011/0110377 | A1* | 5/2011 | Alkhatib | H04L 29/12349 370/395.53 |
| 2011/0167166 | A1* | 7/2011 | Chang | G06F 13/385 709/230 |
| 2013/0102280 | A1 | 4/2013 | Lee | |

(Continued)

FOREIGN PATENT DOCUMENTS

| KR | 10-2012-0069120 | 6/2012 |
| KR | 10-2012-0069413 | 6/2012 |
| KR | 10-2012-0097860 | 9/2012 |

*Primary Examiner* — Mohammad A Siddiqi
(74) *Attorney, Agent, or Firm* — Bacon & Thomas, PLLC

(57) ABSTRACT

A method for managing application data of a portable terminal according to the present invention comprises the steps of: allocating a plurality of data areas required for a data management policy for an application program; when the application program is executed, permitting connection to a specific data area of the plurality of data areas allocated for the application program on the basis of the data management policy; and executing the application program while performing the permitted connection to the specific data area.

13 Claims, 5 Drawing Sheets

(56) References Cited

U.S. PATENT DOCUMENTS

| | | | |
|---|---|---|---|
| 2013/0145439 A1* | 6/2013 | Lee | G06F 21/6245 726/5 |
| 2013/0252582 A1* | 9/2013 | Nakai | H04W 12/08 455/410 |
| 2013/0262385 A1* | 10/2013 | Kumarasamy | G06F 17/30581 707/634 |
| 2014/0074921 A1* | 3/2014 | Poornachandran | G06F 17/30867 709/204 |
| 2014/0129599 A1* | 5/2014 | Boccon-Gibod | G06F 17/30867 707/827 |
| 2014/0180664 A1* | 6/2014 | Kochunni | G06F 11/3442 703/21 |
| 2014/0298022 A1* | 10/2014 | Proennecke | G06F 19/3406 713/168 |
| 2015/0056960 A1* | 2/2015 | Egner | H04W 12/08 455/411 |
| 2015/0248565 A1* | 9/2015 | Onodera | H04M 3/38 726/1 |
| 2016/0057559 A1* | 2/2016 | Deasy | C09J 7/041 455/411 |

\* cited by examiner

METHOD AND APPARATUS FOR MANAGING APPLICATION DATA OF PORTABLE TERMINAL

FIELD OF THE INVENTION

The present invention relates to a technique of managing applications loaded to and executed on a portable device, more particularly, to a method and an apparatus for managing application data in a portable device adapted to allocate multiple data areas to each application program based on a data management policy and to provide limited permission for a connection to each allocated data area based on the data management policy.

BACKGROUND OF THE INVENTION

It is commonly known that virtualization technologies are utilized as relevant technologies for adapting use environments of a portable device (or mobile device) to multi-use environments. Operating system (OS) virtualization technologies configure virtual environments on a portable device to provide different use environments, and application program virtualization technologies virtualize memory areas to ensure independent execution of application programs.

Recently, it is on a gradually rising trend to utilize a portable device for corporate business, and as a way of implementing the foregoing, it is mostly used to separate business environments from non-business environments in a portable device using virtualization technologies.

That is, conventional virtualizations for use in corporate business are mainly focused on generating multiple OS objects in a portable device and distinguishing the objects for business use from those for non-business use. To this end, virtualization layers are established in a portable device, OS for business use and OS for non-business use are installed together on the established virtualization layers, and management technologies for separating OS objects are applied.

Further, a data access (connection) of an application program configured in a form of sandbox can be made only to the data area allocated to the program with an authority, for example, as illustrated in FIG. 1.

That is, the application program APP1 loaded to and executed on operating system (OS) is permitted to access (connect) only to data area 102, while the application program APP2 is permitted to access (connect) only to data area 104.

Accordingly, conventional techniques utilizes a technique of allocating multiple data areas to one application program using memory virtualization technologies.

SUMMARY OF THE INVENTION

Conventional techniques using memory virtualization technologies, however, have the fundamental problem of incurring an unnecessary waste of resources due to their inevitable consumptions of resources for implementing virtualization on a portable device and operating a plurality of OS objects thereon, given that resources available to a portable device are highly limited. This problem eventually causes a decrease in the efficiency of resource utilization.

Moreover, conventional techniques based on virtualization are basically based on virtualization technologies that involves heavy resource consumptions, although the separation of data areas (e.g., data areas for business use, data areas for personal use, etc.) using virtualization can be practiced in different ways. In light of this, it would be challenging to practice such conventional technologies on a portable device (mobile device) environment to which available resources are more limited than those to a conventional PC.

According to an exemplary embodiment of the present disclosure, a method for managing an application data of a portable device may include allocating an application program multiple data areas necessary for a data management policy, when an execution of the application program is selected, permitting a connection to a particular data area of the multiple data areas allocated to the application program based on the data management policy and executing the application program while performing the connection to the permitted particular data area.

The data management policy may be a location-based data isolation policy.

The method may further include while the application program is executed, periodically acquiring a location of the portable device to check whether the location of the portable device is out of a location condition predetermined with the data management policy and when the portable device is out of the predetermined location condition, forcibly terminating the execution of the application program.

The method may further include before said forcibly terminating step, generating a guide message notifying that the portable device is out of the predetermined location condition to display the guide message through a display panel of the portable device.

The data management policy may be a time-based data isolation policy.

The method may further include while the application program is executed, periodically acquiring a current time to check whether the current time is out of a time condition predetermined with the data management policy and when the portable device is out of the predetermined time condition, forcibly terminating the execution of the application program.

The method may further include before said forcibly terminating step, generating a guide message notifying that the current time is out of the predetermined time condition to display the guide message through a display panel of the portable device.

The data management policy may be a-time-per-location-based data isolation policy.

The method may further include while the application program is executed, periodically acquiring a location of a portable device and a current time to check whether the location and current time are out of location and time conditions predetermined with the data management policy and when the portable device is out of the predetermined location and time conditions, forcibly terminating the execution of the application program.

The method may further include before said forcibly terminating step, generating a guide message notifying that the location and current time are out of the predetermined location and time conditions to display the guide message through a display panel of the portable device.

The data management policy may be a data isolation policy based on users pre-registered to a portable device.

The method may further include before said executing step, restoring the particular data area to an original data before the encryption according to a predetermined decryption algorithm.

The method may further include when the execution of the application program is terminated, encrypting and hiding the particular data area through a predetermined encryption algorithm.

The permitting step may further include when a predetermined condition of the data management policy is not met, generating a guide message notifying that the application program cannot be executed because the predetermined condition is not met to display the guide message on a display panel of a portable device.

According to an exemplary embodiment of the present disclosure, an application data management apparatus of a portable device may include a data area allocation block allocating an application program a data area necessary for a data management policy, when a data isolation for the application program is requested, a data area exploration block determining a particular data area for permitting a connection among the multiple data areas allocated to the application program based on the data management policy, when an execution of the application program is selected and an application program execution block executing the application program while performing the connection to the determined particular data area.

The application data management apparatus may further include an encryption block encrypting and hiding the allocated data area through a predetermined encryption algorithm.

The application data management apparatus may further include a restoration block restoring the determined particular data area to an original data before the encryption according to a predetermined decryption algorithm.

The application data management apparatus may further include a policy condition management block acquiring a policy enforcement condition necessary for the data management policy and managing whether acquired policy enforcement condition is out of a predetermined condition of the data management policy, wherein the application program execution block forcibly terminates the execution of the application program when the policy condition management block detects a condition out of the predetermined condition.

The application data management apparatus may further include a message display block generating a guide message notifying the condition out of the predetermined condition to display the guide message through a display panel of a portable device.

The predetermined condition may include at least one of a location condition of a portable device, an execution time condition of the application program, the location condition of the portable device and the execution time condition of the application program, a status condition of a device, or a security level condition of a device.

Effect of the Invention

The present invention may isolate internal data of an application program to which a sandbox security is applied to a data management policy so as to more enhance the security for data, by allocating the application program multiple data areas necessary for a data management policy, when the execution of the application program is selected, permitting the application program to connect to a particular data area of the multiple data areas based on the data management policy, and causing the application program to be executed while carrying out the connection to the permitted particular data area.

In addition, the present invention requires relatively low resource and low cost compared to conventional techniques since it can isolate internal data of an application program without redeveloping the source of the application program and applying operating system virtualization technologies.

DETAILED DESCRIPTION OF THE EMBODIMENTS

Above all, the advantages and features of the present invention, and the methods of achieving them will become more apparent from the following detailed descriptions of embodiments with reference to the accompanying drawings. Herein, the present invention is not limited to the embodiments as disclosed hereinbelow but may be implemented in various different forms. Since the following embodiments are simply provided as examples to make the preset disclosure complete and to enable those skilled in the art to clearly understand the scope of the invention, the technical scope of the present invention should be defined by the appended claims.

In describing the present invention hereinbelow, detailed descriptions on the well-known functions or structures may be omitted when it is determined that they may unnecessarily obscure the substance of the present invention. Further, the terms used hereinbelow are defined considering their usages in the present disclosure, it is apparent that their definitions may vary depending on the intention, custom, or the like of a user, an operator, etc. Accordingly, their definitions should be based on the teachings as described throughout the present disclosure.

Hereinafter, preferred embodiments of the present invention will be described with reference to the accompanying drawings.

Figure 1:
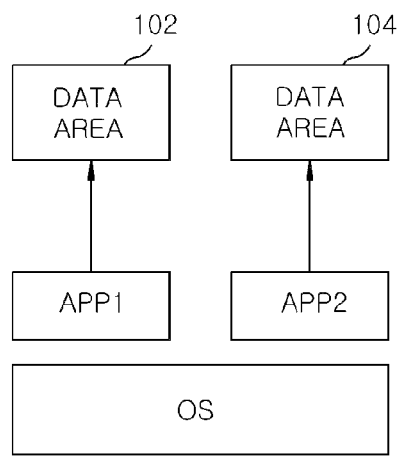
FIG. 1 is a schematic diagram to describe a data access of an application program configured in a sandbox form in accordance with conventional techniques.
Figure 2:
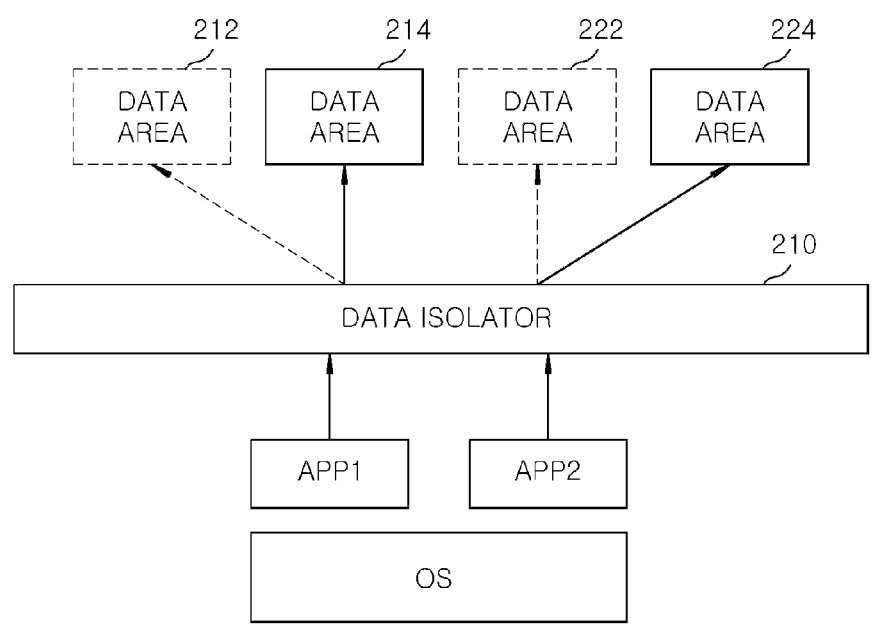
FIG. 2 is a schematic diagram to describe a process of allocating multiple data areas to each application program and then selectively permitting data connection using a data isolator in accordance with the present invention.

FIG. 2 is a schematic diagram to describe a process of allocating multiple data areas to each application program and then selectively permitting data connection using a data isolator in accordance with the present invention.

Referring FIG. 2, provided that two application programs APP1 and APP2 are loaded to and executed on an operating system OS, for example, through a data isolator 210, two data areas 212 and 214 may be allocated to the application program APP1 and two data areas 222 and 224 may be allocated to the application program APP2, and, for instance, the data areas 212 and 222 may refer to public data areas for business use and the data areas 214 and 224 may refer to private data areas for personal use. In this embodiment, a connection (access) by the application program APP1 to the data area 212 or 214 may be selectively permitted under the control of the data isolator 210 based on a data management policy, and a connection (access) by the application program APP2 to the data area 222 or 224 may be selectively permitted under the control of the data isolator 210 based on the data management policy.

Herein, the data isolator 210 may substantially represent an application data management apparatus of the present invention, the configuration and specific functions of the data isolator 210 will be described in detail with reference to FIG. 3.

Moreover, although FIG. 2 illustrates that two data areas are allocated to each application program, this is an exemplary illustration to facilitate understanding and the present invention is not limited to this illustration, but, as necessary or applicable, it may also allocate several or several dozens of data areas to each application program.

Figure 3:
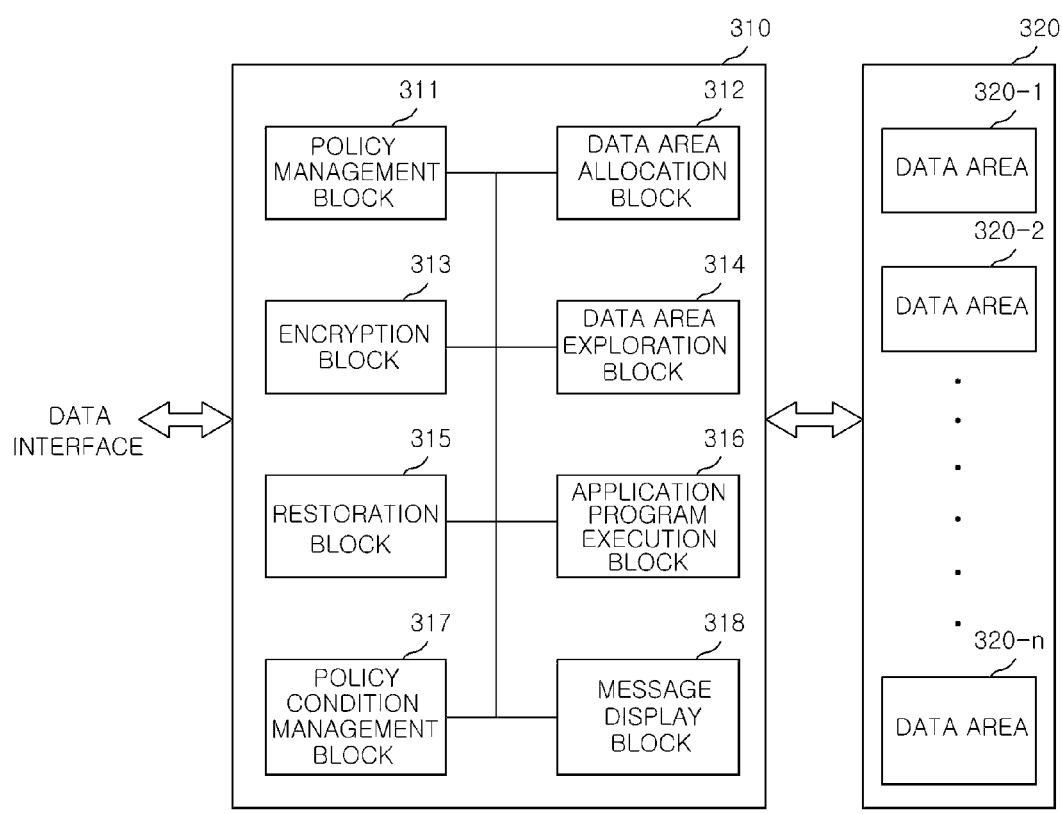
FIG. 3 is a block diagram of an application data management apparatus of a portable device in accordance with an embodiment of the present invention.

FIG. 3 is a block diagram of an application data management apparatus of a portable device in accordance with an embodiment of the present invention. Largely, the application data management apparatus may include an application execution module 310, a memory module 320, and the like. Specifically, the application execution module 310 may include a policy management block 311, a data area allocation block 312, an encryption block 313, a data area exploration block 314, a restoration block 315, an application program execution block 316, a policy condition management block 317, a message display block 318, and the like, and the memory module 320 may include a number of data areas 320-1 to 320-n.

Referring to FIG. 3, the policy management block 311 includes a controller controlling the execution of a data area management in accordance with a data management policy as predetermined by a user of the portable device, and may provide the functions of storing and managing the data management policy predetermined via an data interface with a user input or a remote management server. Herein, the portable device may refer to, for example, a user device such as a mobile phone, a smart phone, a smart pad, a note pad, and a tablet PC.

The predetermined data management policy may be provided (acquired) from a remote management sever (not shown), or may be transferred through a user input sent from an input means (not shown) in the portable device and pre-stored in the memory module 320. In case where the predetermined data management policy is provided from a remote management server, the predetermined data management policy may be acquired through executing (auto execution or selective execution) an information acquisition application separately installed (loaded) to the portable device.

Further, the data policy management may be, for example, at least one of a location-based data isolation policy, a time-based data isolation policy, or a time-per-location-based data isolation policy, and may include one or more of: a data isolation policy based on users pre-registered to the portable device (for example, farther, mother, daughter, son, etc.), a data isolation policy based on the status of a device, or a data isolation policy based on the security level of a device. The status or security level of a device may indicate, for example, whether the device is rooted, whether a security program is used, whether an "unknown source" is permitted, or whether the portable device uses a password.

Provided that a data area for business use and a data area for personal use are allocated to a given application program, the location-based data isolation policy may refer to, for example, permitting a connection (access) only to the data area for business use through executing the given application program when the corresponding portable device is located at a company or the vicinity of the company, and permitting a connection (access) only to the data area for personal use through executing the given application program when the corresponding portable device is located out of a company or the vicinity of the company, or located at the vicinity of the user's home.

In addition, provided that a data area for business use and a data area for personal use are allocated to a given application program and that the company's business hours on weekdays are from 9 a.m. to 6 p.m., the time-based data isolation policy may refer to, for example, permitting a connection (access) only to the data area for business use when the given application program is executed between 8:30 a.m. and 6:30 p.m., and permitting a connection (access) only to the data area for personal use when the given application program is executed at a time out of the time period between 8:30 a.m. and 6:30 p.m.

Moreover, the time-per-location-based data isolation policy may refer to selectively permitting connections (accesses) to the data area for business use and to the data area for personal use with the combination of the location-based data isolation policy and time-based data isolation policy as described above.

Further, a user-based data isolation policy may refer to, for example, provided that a father, mother, daughter, and son are registered as users to a given portable device and that a data area is allocated to each person, the give application program is permitted to connect (access) only to the data area for the father when executed by the father, permitted to connect only to the data area for the mother when executed by the mother, permitted to connect only to the data area for the daughter when executed by the daughter, and permitted to connect only to the data area for the son when executed by the son. Certainly, this case may require a login or the like for a user authentication.

Furthermore, the user-based data isolation policy may be applied as selectively combined with the location-based data isolation policy, the time-based data isolation policy, and the like.

Then, the data area allocation block 312 may provide the functions of allocating (creating) data areas necessary for the data management policy for an application program, once a data isolation for the application program has been requested as per a user operation (interface) of the portable device. For example, a user of the portable device may allocate (create), as necessary or applicable, at least two data areas in the memory module 320 for one application program, and, for instance, may allocate an application program A one data area 320-1 as a data area for business use and the other data area 320-2 as a data area for personal use.

Also, the encryption block 313 may provide the functions of encrypting and hiding the data areas allocated through the data area allocation block 312 with a predetermined encryption algorithm or when the execution of an application program is terminated, encrypting and hiding the data areas to which the application program has been connected (accessed) during its execution with a predetermined encryption algorithm. Herein, encrypting the data areas is to prevent the public data or private data stored in each data area of the portable device from being illegally exposed by rooting or hacking That is, each one of the data areas 320-1 to 320-n in the memory module 320 is encrypted for the security against rooting, hacking, and the like.

In addition, the data area exploration block 314 may provide the function of, when the execution of an application program is selected by the user of the portable device, determining a particular data area for permitting a connection thereto among the multiple data areas allocated to the application program based on a predetermined data management policy.

For instance, provided that a data area for business use and a data area for personal use are allocated to a given application program, that the time-based data isolation policy is predetermined as the data management policy, and that the company's business hours on weekdays are from 9 a.m. to 6 p.m., if the time at which the execution of the given application program is selected by the user of the portable device is 10 a.m., the data area exploration block 314 will permit the given application program to access to the data area for business use.

Next, the restoration block 315 may provide the function of restoring the encrypted data area determined by the data area exploration block 314 (i.e., the data area to which the given application program is permitted to access) to the original data before the encryption with a predetermined decryption algorithm.

Meanwhile, the application program execution block 316 may provide the functions of executing an application program selected by the user of the portable device, performing an access (connection) to the data area to which the running application program is permitted to access in accordance with a predetermined data management policy when executing the application program, and forcibly terminating the currently running application program when a condition out of the predetermined condition is detected (a command for forced termination is generated) through the policy condition management block 317 as described below.

In addition, the policy condition management block 317 may provide the functions of, during the execution of an application program, acquiring a policy enforcement condition necessary for the predetermined data management policy, managing whether the acquired policy enforcement condition is out of the predetermined condition of the data management policy, and generating a command for forced termination and a command for generation of a message when the acquired policy enforcement condition is out of the predetermined condition, and transferring the commands to the application program execution block 316 and the message display block 318, respectively. Herein, the predetermined condition may include, for example, at least one of a location condition of the portable device, a current time (an execution time of the application program) condition, a location of the portable device plus a current time condition, a status condition of the device, or a security level condition of the device.

Further, the message display block 318 may provide the functions of, when the command for generating the message is transferred (i.e., when a condition out of the predetermined condition is detected) from the policy condition management block 317, generating a guide message notifying the condition out of the predetermined condition and displaying it on the display panel (not shown) of the portable device.

Described in detail hereinafter are a series of processes of providing users of portable devices with an application data management service in accordance with a predetermined data management policy through the application data management apparatus having the configurations as described above.

Figure 4:
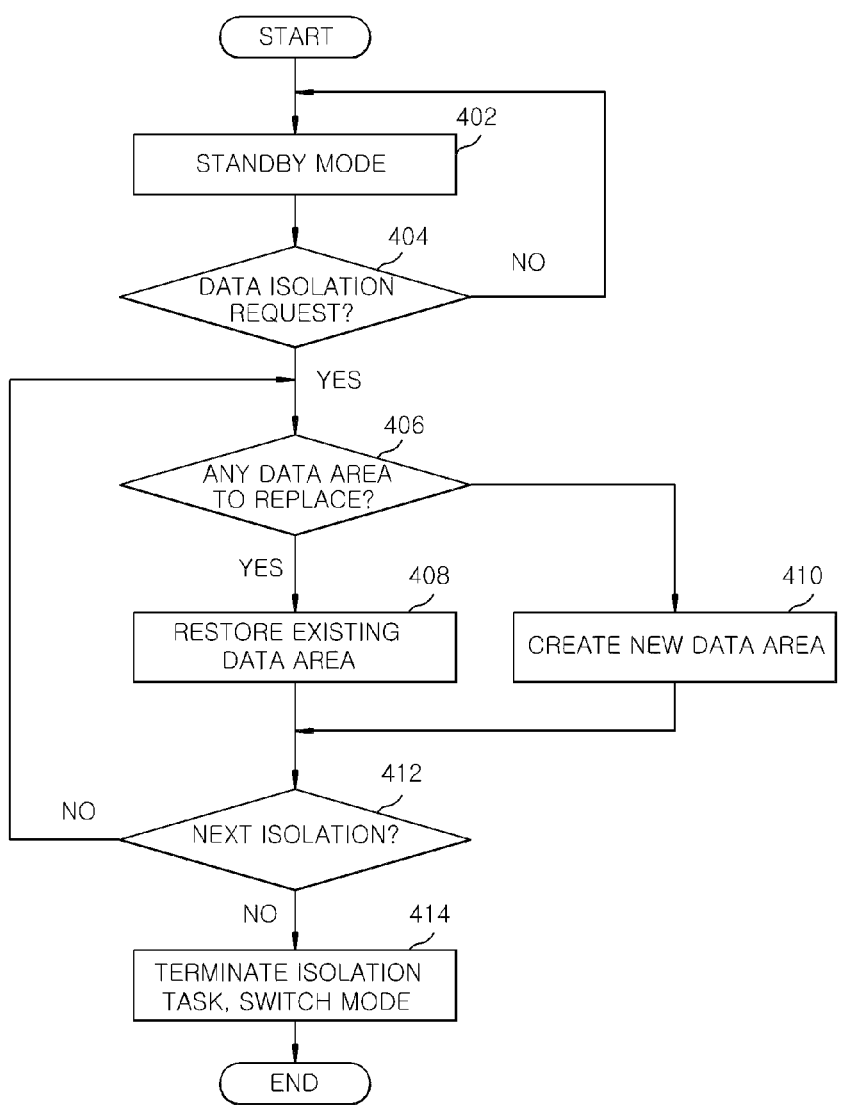
FIG. 4 is a flow chart illustrating a main process of allocating multiple data areas to an application program in accordance with the present invention.

FIG. 4 is a flow chart illustrating a main process of allocating multiple data areas to an application program in accordance with the present invention.

Referring to FIG. 4, while the portable device is in the standby mode (step 402), if a user requests a data isolation to set up a data management policy (step 404), then the data area allocation block 312 checks whether there is any data area to replace the existing data area (executes the data isolation mode) through exploring the memory module 320 in accordance with the control from the policy management block 311 (step 406).

If the check result at step 406 indicates that there is a data area to replace the existing data area in the memory module 320, the data area allocation block 312 notifies the restoration block 315 of the check result, and in response, the restoration block 315 restores (decrypts) the encrypted existing data area to the original data area before the encryption (step 408).

If the check result at step 406 indicates that there is no data area to replace the existing data area in the memory module 320, the data area allocation block 312 creates (allocates) a new data area necessary for the data management policy for the application program (step 410). Herein, the newly created data area is encrypted through the encryption block 313 and stored in the memory module 320.

Then moving to step 412, it is checked whether there is an isolation request for the next data. If the check result indicates that there is an isolation request for the next data, the process proceeds with step 406 and repeats the following steps.

If the check result at step 412 indicates that there is no isolation request for the next data, in accordance with the control from the policy management block 311, the data area allocation block 312 terminates the isolation tasks and switches its mode, i.e., switches from the data isolation mode to the standby mode (step 414).

Figure 5:
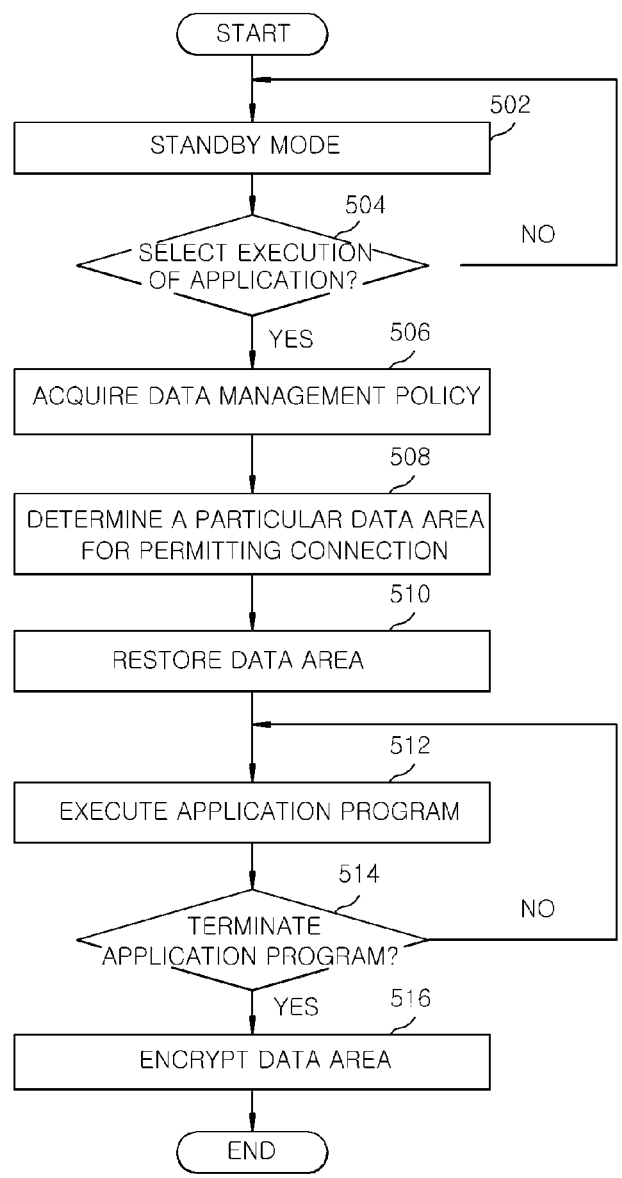
FIG. 5 is a flow chart illustrating a main process of permitting a connection to a certain data area of the multiple data areas allocated to an application program based on a data management policy in accordance with the present invention.

FIG. 5 is a flow chart illustrating a main process of permitting a connection to a certain data area of the multiple data areas allocated to an application program based on a data management policy in accordance with the present invention.

Referring to FIG. 5, while the portable device is in the standby mode (step 502), if a user selects the execution of the application program (application) loaded to the portable device (step 504), then the policy management block 311 acquires a predetermined data management policy (step 506). Here, the predetermined data management policy may be acquired from the remote management server (not shown) through a network or acquired from the memory module 320. The data management policy may include, for example, at least one of a location-based data isolation policy, a time-based data isolation policy, a time-per-location-based data isolation policy, a data isolation policy based on users pre-registered to the portable device (for example, farther, mother, daughter, son, etc.), a data isolation policy based on a status of the device, or a data isolation policy based on a security level of the device.

Then, the data area exploration block 314 determines a particular data area for permitting a connection thereto among the multiple data areas allocated to the application program based on the predetermined data management policy provided from the policy management block 311 (step 508). For example, provided that a data area for business use and a data area for personal use are allocated to a given application program, that the time-based data isolation policy is predetermined as its data management policy, and that the company's business hours on weekdays are from 9 a.m. to 6 p.m., if the time at which the execution of the given application program is selected by a user of the portable device is 10 a.m., the data area exploration block 314 will determine the access of the given application program to the data area for business use.

Obviously, the predetermined condition of the data management policy may not be met when the user selects the execution of the application program. In this case, the data area exploration block 314 commands the message display block 318 to generate a guide message to notify the unmet condition. In response, the message display block 318 may generate the guide message to notify that the application program selected by the user cannot be executed because the predetermined condition of the data management policy is not met, and display it on the display panel of the portable device.

Then, the restoration block 315 restores the encrypted data area determined by the data area exploration block 314, i.e., the data area to which the application program is permitted to access, to the original data before the encryption in accordance with a predetermined decryption algorithm (step 510), and the application program execution block 316 executes the application program selected by the user while selectively connecting it to the restored data area (step 512).

Moving to step 514, it is checked whether the user selects the termination of the currently running application program. If the user selects the termination of the application program, the application program execution block 316 terminates the execution of the application program, and the encryption block 313 encrypts again the data areas that have been restored for the access of the application program thereto and stores them in the memory module 320 (step 516).

Figure 6:
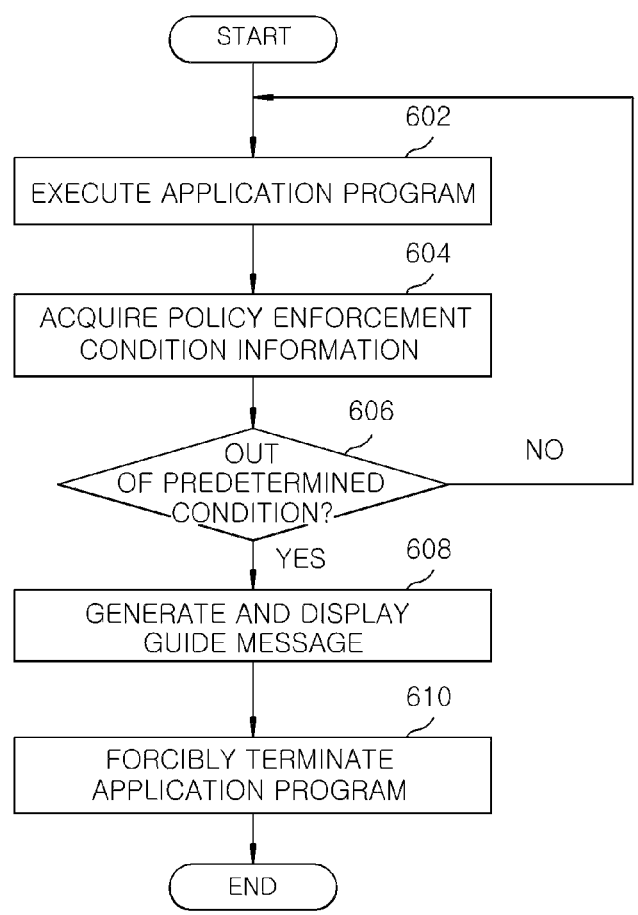
FIG. 6 is a flow chart illustrating a main process of forcibly terminating the running application program when the policy enforcement condition as periodically acquired is out of a predetermined condition.

FIG. 6 is a flow chart illustrating a main process of forcibly terminating the running application program when the policy enforcement condition as periodically acquired is out of a predetermined condition.

Referring to FIG. 6, during the execution of the application program based on the data management policy predetermined in accordance with the selection of the user (step 602), the policy condition management block 317 periodically acquires the policy enforcement condition necessary for the predetermined data management policy (step 604).

Again, the policy condition management block 317 checks whether the acquired policy enforcement condition is out of the predetermined condition of the data management policy (step 606), where the predetermined condition may include, for example, at least one of a location condition of the portable device, an execution time condition of the application program, a location condition of the portable device plus an execution time condition of the application program, a status condition of the device, or a security level condition of the device.

If the check result at step 606 indicates that the acquired policy enforcement condition is out of the predetermined condition, the policy condition management block 317 generates a command for forced termination and a command for generation of the message accordingly and transferring the commands to the application program execution block 316 and the message display block 318, respectively.

As a result, in response to the command for generation of the message transferred from the policy condition management block 317, the message display block 318 generates a guide message notifying the condition out of the predetermined condition and displaying it on the display panel (not shown) of the portable device (step 608). In response to the command for forced termination transferred from the policy condition management block 317, the application program execution block 316 forcibly terminates the currently running application program (step 610).

Meanwhile, although the embodiments in the present disclosure above are described to forcibly terminate the currently running application program when the policy enforcement condition acquired during the execution of the application program is out of the predetermined condition, the present invention should not be limited to these embodiments and it is obvious that an embodiment of the present invention may also be to configured to change the accessible data areas instead of forcibly terminating the running application program. For example, if a user goes out of a company area carrying a portable device while executing an application program at the company area, then the data area exploration block may change the permission for access to the data area for business use to the permission for access to the data area for personal use in accordance with the commands from the policy condition management block.

The present disclosure as above is no more than exemplary descriptions on the technical idea of the present invention, it will be easily understood by those skilled in the art that various substitutions, modifications, and changes may be made without departing from the subject matter of the present invention. That is, the embodiments in the present disclosure are not intended to limit the subject matter of the present invention but to describe it, and thus, the scope of the subject matter of the present invention is not limited to the embodiments.

Therefore, the protection scope of the present invention should be construed by the appended claims and all the technical ideas in the equivalent scope should be construed to be covered by the claimed scope of the present invention.

What is claimed is:

1. A method for managing an application data of a portable device including an application execution module and a memory module, the method comprising:

allocating, by the application execution module, multiple data areas in the memory module necessary for a data management policy to an application program, the multiple data areas including a first data area and a second data area;

when an execution of the application program is selected, permitting, by the application execution module, an access of the application program to the first data area while prohibiting an access of the application program to the second data area, or permitting the access of the application program to the second data area while prohibiting the access of the application program to the first data area based on the data management policy in consideration of a situation when the portable device is used; and executing, by the application execution module, the application program while performing the access of the application program to the permitted data area among the first data area and the second data area;

wherein the data management policy is a time-based data isolation policy;

while the application program is executed, periodically acquiring a current time to check whether the current time is out of a time condition predetermined with the data management policy, and when the portable device is out of the predetermined time condition, forcibly terminating the execution of the application program; and before said forcibly terminating step, generating a guide message notifying that the current time is out of the predetermined time condition to display the guide message through a display panel of the portable device.

2. The method of claim 1, wherein the data management policy is a location-based data isolation policy.

3. The method of claim 2, further comprising:

while the application program is executed, periodically acquiring a location of the portable device to check whether the location of the portable device is out of a location condition predetermined with the data management policy; and when the portable device is out of the predetermined location condition, forcibly terminating the execution of the application program.

4. The method of claim 3, further comprising before said forcibly terminating step, generating a guide message notifying that the portable device is out of the predetermined location condition to display the guide message through a display panel of the portable device.

5. The method of claim 1, wherein the data management policy is a data isolation policy based on users pre-registered to a portable device.

6. The method of claim 1, further comprising before said executing step, restoring the first data area to an original data before the encryption according to a predetermined decryption algorithm.

7. The method of claim 1 further comprising when the execution of the application program is terminated, encrypting and hiding the first data area through a predetermined encryption algorithm.

8. The method of claim 1, wherein said permitting step further comprises when a predetermined condition of the data management policy is not met, generating a guide message notifying that the application program cannot be executed because the predetermined condition is not met to display the guide message on a display panel of a portable device.

9. A method for managing an application data of a portable device including an application execution module and a memory module, the method comprising:

allocating, by the application execution module, multiple data areas in the memory module necessary for a data management policy to an application program, the multiple data areas including a first data area and a second data area;

when an execution of the application program is selected, permitting, by the application execution module, an access of the application program to the first data area while prohibiting an access of the application program to the second data area, or permitting the access of the application program to the second data area while prohibiting the access of the application program to the first data area based on the data management policy in consideration of a situation when the portable device is used; and executing, by the application execution module, the application program while performing the access of the application program to the permitted data area among the first data area and the second data area;

wherein the data management policy is a-time-per-location-based data isolation policy;

while the application program is executed, periodically acquiring a location of a portable device and a current time to check whether the location and current time are out of location and time conditions predetermined with the data management policy; and when the portable device is out of the predetermined location and time conditions, forcibly terminating the execution of the application program; and before said forcibly terminating step, generating a guide message notifying that the location and current time are out of the predetermined location and time conditions to display the guide message through a display panel of the portable device.

10. An application data management apparatus of a portable device comprising:

an application execution module; and a memory module including multiple data areas including a first data area and a second data area, wherein the application execution module includes:

a data area allocation block allocating the multiple data areas necessary for a data management policy to an application program when a data isolation for the application program is requested;

a data area exploration block determining the first data area for permitting an access of the application program to the first data area while prohibiting an access of the application program to the second data area, or permitting the access of the application program to the second data area while prohibiting the access of the application program to the first data area based on the data management policy in consideration of a situation when the portable device is used, when an execution of the application program is selected;

an application program execution block executing the application program while performing the access of the application program to the permitted data area among the first data area and the second data area;

a policy condition management block acquiring a policy enforcement condition necessary for the data management policy and managing whether acquired policy enforcement condition is out of a predetermined condition of the data management policy, wherein the application program execution block forcibly terminates the execution of the application program when the policy condition management block detects a condition out of the predetermined condition; and a message display block generating a guide message notifying the condition out of the predetermined condition to display the guide message through a display panel of a portable device.

11. The application data management apparatus of claim 10, further comprising an encryption block encrypting and hiding the allocated data area through a predetermined encryption algorithm.

12. The application data management apparatus of claim 11, further comprising a restoration block restoring the determined first data area to an original data before the encryption according to a predetermined decryption algorithm.

13. The application data management apparatus of claim 10, wherein the predetermined condition includes at least one of a location condition of a portable device, an execution time condition of the application program, the location condition of the portable device and the execution time condition of the application program, a status condition of a device, or a security level condition of a device.

* * * * *